United States Patent [19]

Graft

[11] Patent Number: 4,762,024
[45] Date of Patent: Aug. 9, 1988

[54] SHAFT RETAINING MEANS FOR A DIFFERENTIAL GEAR ASSEMBLY

[75] Inventor: John T. Graft, Ft. Wayne, Ind.

[73] Assignee: Dana Corporation, Toledo, Ohio

[21] Appl. No.: 77,061

[22] Filed: Jul. 23, 1987

Related U.S. Application Data

[63] Continuation of Ser. No. 760,593, Jul. 30, 1985, abandoned.

[51] Int. Cl.⁴ .................... F16H 1/38; F16H 1/42
[52] U.S. Cl. ......................... 74/715; 74/714; 403/326
[58] Field of Search ............ 74/713, 714, 715; 403/326

[56] References Cited

U.S. PATENT DOCUMENTS

| | | |
|---|---|---|
| 738,503 | 9/1903 | Waters . |
| 787,775 | 4/1905 | Lewis . |
| 1,054,942 | 3/1913 | Rhoads et al. . |
| 1,211,582 | 1/1917 | Hobart . |
| 1,252,388 | 1/1918 | Bickley . |
| 1,293,068 | 2/1919 | Fischer . |
| 1,443,014 | 1/1923 | Edwards . |
| 1,554,475 | 9/1925 | Wendell et al. . |
| 1,637,247 | 7/1927 | Snyder . |
| 1,893,255 | 1/1933 | Tracy . |
| 2,699,075 | 1/1955 | Buckendale .............. 74/710 |
| 2,844,013 | 7/1958 | Spence ...................... 64/21 |
| 2,859,641 | 11/1958 | Gleasman .................. 74/715 |
| 2,922,316 | 1/1960 | Schmid ...................... 74/493 |
| 2,987,897 | 6/1961 | Spence ...................... 64/21 |
| 3,655,226 | 4/1972 | Cowan ..................... 287/119 |
| 3,735,647 | 5/1973 | Gleasman .................. 74/715 |
| 3,750,489 | 8/1973 | Caldwell .................... 74/434 |
| 3,821,908 | 7/1974 | Marsch et al. ............. 74/801 |
| 3,832,076 | 8/1974 | Gehrke .................... 403/359 |
| 3,875,824 | 4/1975 | Benjamin .................. 74/715 |
| 3,992,117 | 11/1976 | Ristau ...................... 403/14 |
| 4,124,318 | 11/1978 | Sagady ...................... 403/14 |
| 4,136,982 | 1/1979 | Sagady .................... 403/108 |
| 4,222,290 | 9/1980 | Helmer et al. ............. 74/801 |
| 4,225,263 | 9/1980 | Asberg ..................... 403/326 |
| 4,245,524 | 1/1981 | Dammon .................. 74/710.5 |
| 4,261,668 | 4/1981 | Rigal ....................... 403/319 |
| 4,286,481 | 9/1981 | Miller ..................... 74/713 X |
| 4,365,524 | 12/1982 | Dissett et al. ............. 74/715 |
| 4,371,214 | 1/1983 | Strader .................... 301/126 |
| 4,435,996 | 3/1984 | Gorby ..................... 74/713 |
| 4,480,500 | 11/1984 | Yamampri et al. ......... 74/713 |
| 4,512,211 | 4/1985 | Stritzel ................... 74/714 X |

*Primary Examiner*—Dirk Wright
*Attorney, Agent, or Firm*—MacMillan, Sobanski & Todd

[57] ABSTRACT

The present invention relates to a device for retaining a shaft within a differential case. A first groove is formed on the interior of an aperture formed through the differential case, which aperture is adapted to receive and retain one end of a shaft therein. The end of the aperture which faces outwardly of the differential case is provided with a chamfered shoulder thereabout. One or both of the sidewalls of the first groove are also chamfered outwardly from the groove. A second groove is formed in the exterior of the end of the shaft. The first and second grooves are adapted to be aligned when the end of the shaft is in a desired position relative to the differential case. A retaining ring is disposed in the first and second grooves in interfering relationship between the shaft and the differential case so as to prevent axial movement of the shaft relative to the differential case. The depths of the two grooves and the angles of inclination of the sidewalls of the first groove formed in the differential case can be varied so as to permit or prevent destruction of the retaining ring when the shaft is removed therefrom, and further to vary the amount of force required to accomplish such disassembly.

3 Claims, 2 Drawing Sheets

SHAFT RETAINING MEANS FOR A DIFFERENTIAL GEAR ASSEMBLY

This is a continuation of application Ser. No. 760,593 filed July 30, 1985, and now abandoned.

BACKGROUND OF THE INVENTION

The present invention relates in general to differential gear assemblies and in particularly to an improved means for retaining a gear-supporting shaft within a differential case.

Differential gear assemblies are well known in the art and typically include one or more shafts retained within a case for rotatably supporting certain gears. One problem associated with such differential gear assemblies involves the particular means for retaining such shafts within the differential case. A number of means are commonly utilized to perform this retaining function, namely, lock pins, spring pins, screws, external snap rings, and the like. Unfortunately, such prior art retaining means usually require a number of extra loose parts, which contribute to the complexity and cost of the differential gear assembly. Also, such prior art retaining means frequently extend or are disposed externally of the differential case, thus enlarging the amount of space required to contain the differential gear assembly. Finally, special tools are often required to assemble and disassemble such prior art differential gear assemblies. Accordingly, it would be desirable to provide a means for retaining a shaft within a differential case which avoids these problems.

SUMMARY OF THE INVENTION

The present invention relates to an improved means for retaining a shaft within a differential case. A first groove is formed on the interior of an aperture formed through the differential case, which aperture is adapted to receive and retain one end of a shaft therein. The end of the aperture which faces outwardly of the differential case is provided with a chamfered shoulder thereabout. One or both of the sidewalls of the first groove are also chamfered outwardly from the groove. A second groove is formed in the exterior of the end of the shaft. The first and second grooves are adapted to be aligned when the end of the shaft is in a desired position relative to the differential case. A retaining ring is disposed in the first and second grooves in interfering relationship between the shaft and the differential case so as to prevent axial movement of the shaft relative to the differential case. The depths of the two grooves and the angles of inclination of the sidewalls of the first groove formed in the differential case can be varied so as to permit or prevent destruction of the retaining ring when the shaft is removed therefrom, and further to vary the amount of force required to accomplish such disassembly.

It is an object of the present invention to provide an improved means for retaining a shaft within a differential gear assembly.

It is another object of the present invention to provide such a shaft retaining means which permits simple and rapid assembly and disassembly of a shaft in a differential gear assembly.

It is a further object of the present invention to provide such a shaft retaining means which permits such assembly and disassembly with a minimum number of parts and without the use of tools.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENTS

Figure 1:
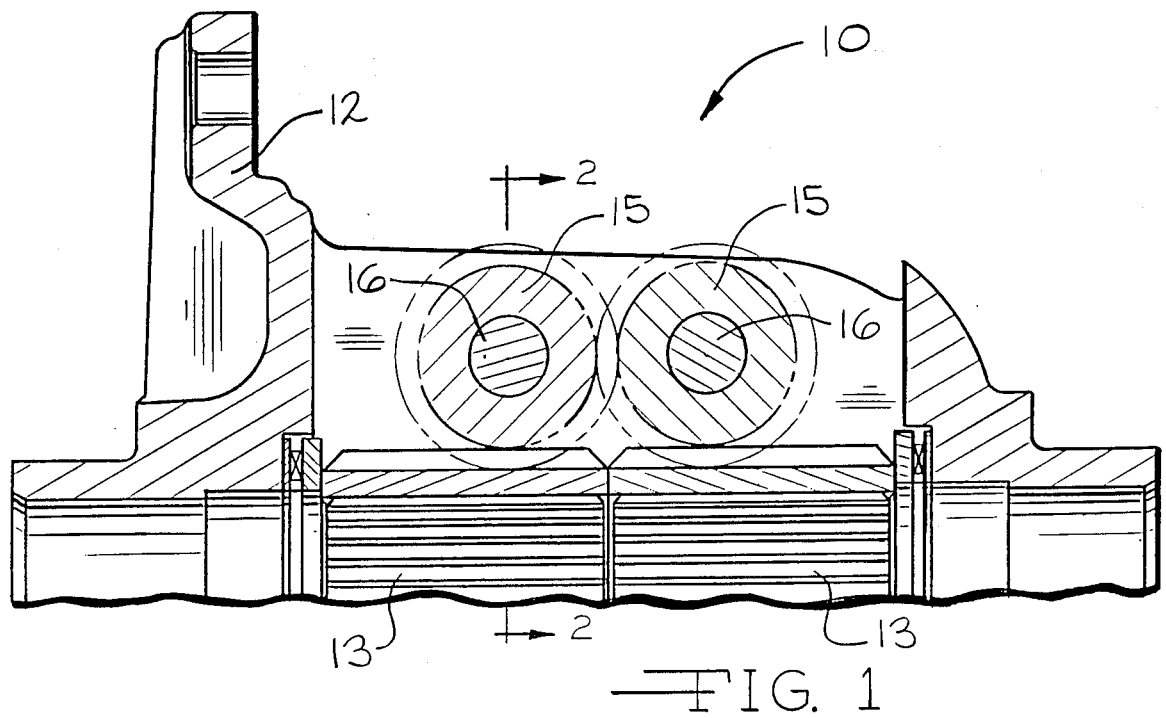
FIG. 1 is a fragmentary sectional elevational view of a differential gear assembly incorporating a shaft retaining means in accordance with the present invention.
Figure 2:
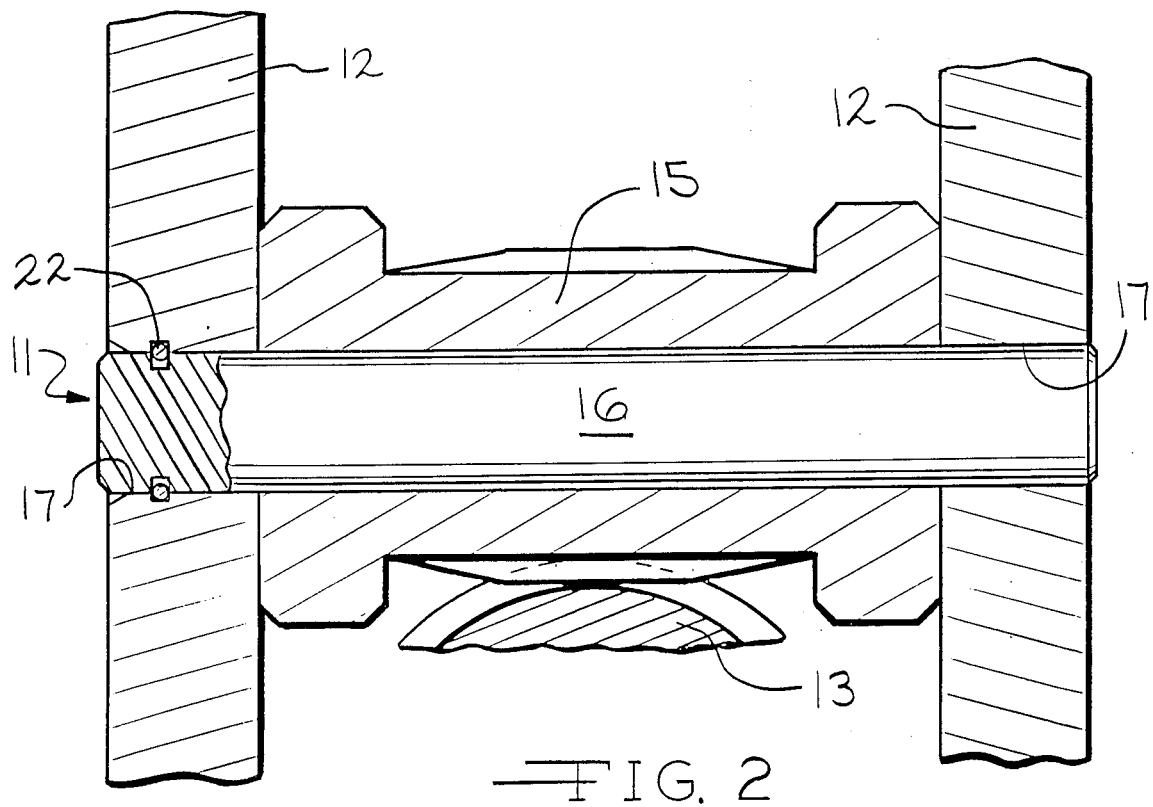
FIG. 2 is a cross sectional view taken along line 2—2 of FIG. 1.
Figure 3:
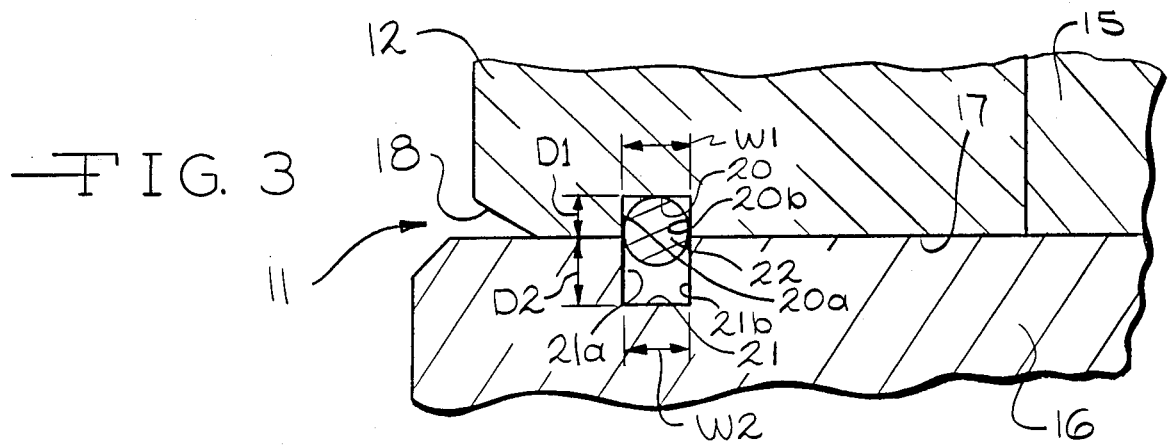
FIG. 3 is an enlarged fragmentary view of the shaft retaining means illustrated in FIG. 2.

Referring now to FIGS. 1 through 3, there is illustrated a differential gear assembly for a vehicle, indicated generally at 10, incorporating an improved shaft retaining means, indicated generally at 11, in accordance with the present invention. The illustrated differential gear assembly 10 is somewhat similar in structure and operation to that disclosed in U.S. Pat. Nos. 2,859,641 and 3,735,647, both to Gleasman, to which reference may be made for a more detailed description thereof. Although the present invention will be described and illustrated in the context of this type of differential gear assembly, it will be appreciated that the present invention can be utilized to retain a shaft in other types of differential gear assemblies.

The differential gear assembly 10 includes a differential case 12 within which a pair of externally threaded differential gears 13 are rotatably journalled axially with respect to one another. The differential gears 13 are connected to respective drive axles (not shown) for rotation therewith. About the periphery of the differential gears 13, a plurality of balance gears 15 (only two are illustrated) are disposed. The balance gears 15 are rotatably supported on respective shafts 16 retained at either end in respective apertures 17 formed in spaced apart walls of the differential case 12 in axial alignment with one another. The balance gears 15 are externally threaded and are adapted to engage the threads formed on the differential gears 13 such that rotation of the differential case 12 causes rotation of the differential gears 13 and, consequently, the drive axles of the vehicle in a known manner. A chamfered edge 18 is provided on the outer surface of the differential case 12 about the periphery of one of the apertures 17 facing outwardly therefrom. The function of the chamfered edge 18 will be explained in greater detail below.

As illustrated most clearly in FIG. 3, a first annular groove 20 is formed on the interior of one of the apertures 17 formed in the differential case. Sidewalls 20a and 20b of the groove 20 are both formed perpendicularly with respect to the longitudinal axis of the aperture 17. The groove 20 has a depth illustrated as D1 and a width illustrated as W1. A second annular groove 21 is formed in the exterior of the shaft 16 near one end thereof. Sidewalls 21a and 21b of the second groove 21 are also both formed perpendicularly with respect to the longitudinal axis of the apertures 17. The second groove 21 has a depth illustrated as D2 and a width illustrated as W2. The first and second grooves 20 and 21 are adapted to be aligned with one another when the shaft 16 is disposed in a desired axial position relative to the differential case 12. A retaining ring 22 is disposed in the first and second grooves 20 and 21 in interfering relationship between the shaft 16 and the differential case 12 so as to prevent axial movement of the shaft 16 relative to the differential case 12 when this desired axial alignment is attained. Although the retaining ring 22 is illustrated as being circular in cross-section, it will be appreciated that other cross-sectional configurations can be utilized if desired, such as oval, square, and the like.

The retaining ring 22 can consist of a conventional C-shaped wire member. In its relaxed condition, the outer diameter of the retaining ring 22 should be equal to or slightly greater than the diameter of the first groove 20, as defined by the depth D1. The retaining ring 22 must be capable of being compressed completely within the second groove 21 without permanent deformation. Thus, the depth D1 of the first groove 20 can be chosen as any value less than the diameter of the retaining ring 22. The depth D2 of the second groove 21, on the other hand, must be greater than or equal to the diameter of the retaining ring 22. The width W1 of the first groove 20 and the width W2 of the second groove 21 are selected to be greater than or equal to the width of the wire member 22, as measured axially with respect to the longitudinal axis of the apertures 17. Typically, such widths W1 and W2 are formed only slightly larger than the width of the wire member 22.

To assemble the shaft 16 in the differential case 12, the retaining ring 22 is initially disposed about the second groove 21 formed in the one end of the shaft 16. The opposite end of the shaft 16 is then inserted in the aperture 17 through the chamfered shoulder 18. As the shaft 16 is then moved axially inwardly through the aperture 17 formed in the differential case 12, the retaining ring 22 engages the chamfered shoulder 18, causing the retaining ring 22 to be compressed within the groove 21 until it is completely enclosed therein. This is possible because, as mentioned above, the depth D2 of the second groove 21 is greater than or equal to the diameter of the retaining ring 22. When the second groove 21 is radially aligned with the first groove 20, as illustrated in FIG. 3, the retaining ring 22 will spring outwardly into engagement with the first groove 20. Since the depth D1 of the first groove 20 is selected to be less than the diameter of the retaining ring 22, as measured perpendicularly with respect to the axis of the apertures 17, the retaining ring 22 will be maintained in an interfering relationship between the shaft 16 and the differential case 12. Thus, axial movement of the shaft 16 relative to the differential case 12 will be prevented.

The embodiment illustrated in FIG. 3 will cause damage to occur to one or more of the components of the retaining means 11 if the shaft 16 is removed from the differential case 12. Typically, such damage will consist of shearing or other permanent deformation of the retaining ring 22. Such damage will occur whether the diameter of the retaining ring is greater than, equal to, or less than the depth D1 of the first groove 20 because the sidewalls 20a and 20b thereof are formed perpendicularly with respect to the longitudinal axis of the apertures 17 and, consequently, the direction of movement of the shaft 16 during assembly and disassembly. However, FIGS. 4, 5, and 6 illustrate alternative embodiments wherein such damage may be prevented.

Figure 4:
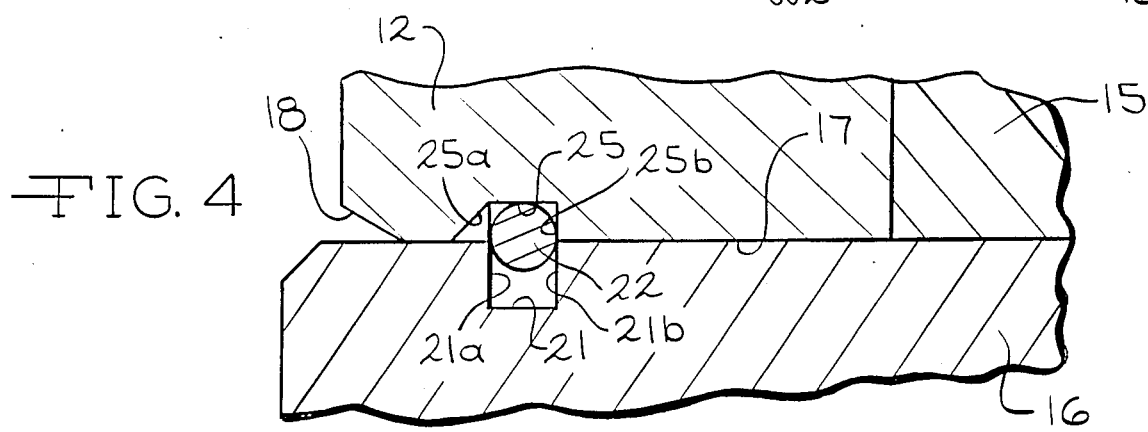
FIG. 4 is a view similar to FIG. 3 illustrating a first alternate embodiment of the retaining means of the present invention.

FIG. 4 illustrates a first alternate embodiment of the retaining means 11 of the present invention. As illustrated therein, a modified first groove 25 is formed in the differential case 12. The first groove 25 includes a chamfered sidewall 25a formed on the side of the groove 25 nearest to the chamfered shoulder 18, while the other sidewall 25b of the groove 25 is formed perpendicularly with respect to the longitudinal axis of the apertures 17. The second groove 21 formed in the shaft 16 and the retaining ring 22 can be formed the same as described above. Similarly, the depths D1 and D2 and the widths W1 and W2 (not illustrated for simplicity) of the grooves 25 and 21, respectively, can be measured as described above. If the depth D1 of the first groove 25 is less than half the diameter of the wire member 22, then the shaft 16 may be disassembled from the differential case 12 without damage occurring to any of the components of the retaining means. To do so, the shaft 16 must be withdrawn outwardly of the differential case 12 through the chamfered shoulder 18, i.e., to the left when viewing FIG. 4. Such movement will cause the perpendicular sidewall 21b of the second groove 21 to push the retaining ring 22 against the chamfered sidewall 25a so as to compress the retaining ring 22 completely within the second groove 21 for removal. It will be appreciated that such compression of the retaining ring 22 will not occur if the depth D1 of the first groove 25 is greater than or equal to one half the diameter of the retaining ring 22. In such a retaining means, the engagement of the retaining ring 22 by the perpendicular sidewall 21b will exert a force against the retaining ring 22 which not only includes a component in the direction of movement of the shaft 16, but also a component perpendicular thereto. The perpendicular component of such force will prevent the retaining ring 22 from moving inwardly when it engages the chamfered sidewall 25a. Thus, the depth D1 of the first groove 25 will determine whether the shaft 16 may be removed from the differential case 12 without damage to one of the components of the retaining means.

Figure 5:
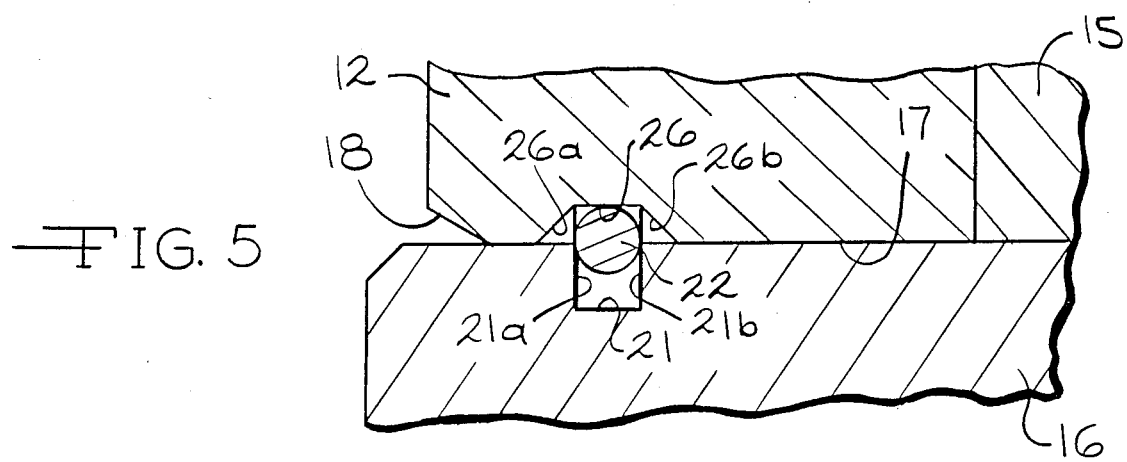
FIG. 5 is a view similar to FIG. 3 illustrating a second alternative embodiment of the retaining means of the present invention.

FIG. 5 discloses a second alternate embodiment of the retaining means 11 of the present invention. As illustrated therein, a modified first groove 26 includes a pair of chamfered sidewalls 26a and 26b. The second groove 21 formed in the shaft 16 and the retarning ring 22 can be formed the same as described above. Similarly, the depth D1 and D2 and the width W1 and W2 (not illustrated for simplicity) of the groove 26 and 21, respectively, can be measured as described above. In this embodiment, the shaft 16 may be disassembled from the differential case 12 in either direction, depending upon the relationship between the depth D1 of the first groove 26 and the diameter of the retaining ring 22, as described above.

Figure 6:
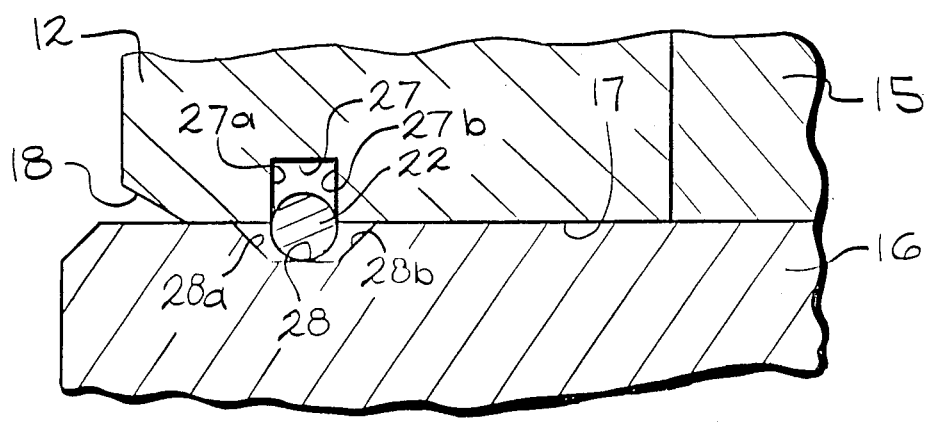
FIG. 6 is a view similar to FIG. 3 illustrating a third alternate embodiment of the retaining means of the present invention.

FIG. 6 illustrates a third alternate embodiment of the retaining means of the present invention. As illustrated therein, a modified first groove 27 is formed in the differential case 12. The first groove 27 includes a pair of sidewalls 27a and 27b which are formed perpendicularly with respect to the longitudinal axis of the apertures 17. Similarly, a modified second groove 28 is formed in the shaft 16. The second groove 28 includes a pair of chamfered sidewalls 28a and 28b. The retaining ring 22 can be formed the same as described above. Similarly, the depths D1 and D2 and the widths W1 and W2 (not illustrated for simplicity) of the grooves 27 and 28, respectively, can be measured as described above. It will be appreciated that the embodiment illustrated in FIG. 6 is basically a reverse application of the embodiment illustrated in FIG. 5. Accordingly, the depth D1 of the first groove 27 must be greater than or equal to the diameter of the retaining ring 22 to permit the retaining ring 22 to be compressed completely therein during assembly and disassembly. The depth D2 of the second groove 28, on the other hand, can be chosen as any value less than the diameter of the retaining ring 22. If the depth D2 of the second groove 28 is greater than or equal to one half the diameter of the retaining ring 22, then damage will occur to one of the components of the retaining means if the shaft 16 is removed from the aperture 17. If the depth D2 of the second groove 28 is less than one half the diameter of the retaining ring 22, then damage may be prevented from occurring when disassembling the shaft 16 from the aperture 17.

In accordance with the provisions of the patent statutes, the principle and mode of operation of the present invention have been explained and illustrated in its preferred embodiments. However, it must be appreciated that the present invention can be practiced otherwise than as specifically explained and illustrated without departing from its spirit or scope.

What is claimed is:

1. A differential gear assembly comprising:
   a rotatable case having an outer surface and a generally hollow interior, at least one pair of walls being defined by said case which are spaced apart from one another across said interior;
   an aperture formed through each of said spaced apart walls, said apertures defining an axis therethrough;
   a flat portion formed in said outer surface of said case, one of said apertures extending through said wall to said flat surface, said flat surface being oriented perpendicularly relative to said axis defined by said apertures;
   a shaft disposed within said case and extending between said apertures, said shaft being rotatable relative to said case; and
   means for selectively preventing axial movement of said shaft relative to said case including a first annular groove formed in the interior of said one aperture, a second annular groove formed in the exterior of said shaft, and a retaining ring adapted to be disposed in said first and second grooves in interfering relationship between said shaft and said case so as to prevent axial movement of said shaft relative to said case when a desired axial alignment is attained.

2. The invention defined in claim 1 wherein said first annular groove has a first predetermined depth, said second annular groove has a second predetermined depth, and said retaining ring has a cross sectional diameter which is greater than said first predetermined depth and not greater than said second predetermined depth.

3. The invention defined in claim 1 further including a chamfered edge formed on said flat surface about said one aperture extending therethrough.

* * * * *